(12) United States Patent
Hata

(10) Patent No.: US 11,863,042 B2
(45) Date of Patent: Jan. 2, 2024

(54) POWER TRANSMISSION DEVICE

(71) Applicant: SUMIDA CORPORATION, Tokyo (JP)

(72) Inventor: Ryuhei Hata, Natori (JP)

(73) Assignee: SUMIDA CORPORATION

(*) Notice: Subject to any disclaimer, the term of this patent is extended or adjusted under 35 U.S.C. 154(b) by 65 days.

(21) Appl. No.: 17/467,576

(22) Filed: Sep. 7, 2021

(65) Prior Publication Data

US 2022/0077756 A1 Mar. 10, 2022

(30) Foreign Application Priority Data

Sep. 9, 2020 (JP) ................................. 2020-150936

(51) Int. Cl.
 *H02K 49/10* (2006.01)
(52) U.S. Cl.
 CPC ................................. *H02K 49/102* (2013.01)
(58) Field of Classification Search
 CPC .. H02K 1/00; H02K 1/02; H02K 7/00; H02K 7/003; H02K 19/00; H02K 19/12; H02K 11/00; H02K 11/0094; H02K 49/00; H02K 49/10; H02K 49/102; H01F 38/00; H01F 38/14; H01F 38/18; H01F 3/00; H01F 3/10; H01F 3/14; H01F 27/00; H01F 27/163
 See application file for complete search history.

(56) References Cited

U.S. PATENT DOCUMENTS

2013/0241367 A1* 9/2013 Taniguchi .............. H02K 7/003
 310/68 D

FOREIGN PATENT DOCUMENTS

| DE | 102014202719 A1 | 8/2015 |
| EP | 1464936 | * 10/2004 |
| JP | 2000150277 A | 5/2000 |
| JP | 2007189784 | * 7/2007 |
| JP | 2013-198258 A | 9/2013 |
| WO | 2012-035100 A1 | 3/2012 |

OTHER PUBLICATIONS

European Search Report issued for the corresponding European Patent Application No. EP21194003.6; dated Feb. 14, 2022 (total 11 pages).

* cited by examiner

*Primary Examiner* — Tran N Nguyen
(74) *Attorney, Agent, or Firm* — Harness, Dickey & Pierce, P.L.C.

(57) ABSTRACT

A power transmission device includes an annular transmission unit having an annular first magnetic core and a transmission coil and an annular reception unit having an annular second magnetic core and a reception coil. The transmission unit and the reception unit are arranged to face each other. The power transmission device transmits power from the transmission unit to the reception unit. The transmission unit and the reception unit are relatively rotatable about a rotation axis passing through a cavity inside the transmission unit and a cavity inside the reception unit, the first magnetic core has a structure divided into a plurality of first split cores in a circumferential direction, and the second magnetic core has a structure divided into a plurality of second split cores in the circumferential direction.

7 Claims, 10 Drawing Sheets

| FREQUENCY [kHz] | TRUE L [µH] | L [µH] | R [mohm] | Q |
|---|---|---|---|---|
| 1.0 | 17.53 | 17.53 | 61 | 2 |
| 3.3 | 17.43 | 17.43 | 65 | 6 |
| 10 | 17.16 | 17.16 | 77 | 14 |
| 33 | 16.98 | 16.98 | 89 | 39 |
| 100 | 16.93 | 16.94 | 107 | 100 |
| 330 | 16.90 | 16.92 | 159 | 220 |
| 1,000 | 16.87 | 17.06 | 261 | 411 |
| 3,300 | 16.86 | 19.07 | 501 | 789 |
| 4,700 | 16.86 | 22.04 | 733 | 888 |
| 6,800 | 16.85 | 33.19 | 1812 | 783 |
| 10,000 | 16.85 | -261.35 | 121448 | -135 |

| FREQUENCY [kHz] | TRUE L [μH] | L [μH] | R [mohm] | Q |
|---|---|---|---|---|
| 1.0 | 13.89 | 13.89 | 61 | 1 |
| 3.3 | 13.69 | 13.69 | 71 | 4 |
| 10 | 13.00 | 13.00 | 107 | 8 |
| 33 | 12.45 | 12.45 | 149 | 17 |
| 100 | 12.30 | 12.30 | 200 | 39 |
| 330 | 12.19 | 12.20 | 354 | 71 |
| 1,000 | 12.12 | 12.22 | 633 | 121 |
| 3,300 | 12.08 | 13.17 | 1166 | 234 |
| 4,700 | 12.07 | 14.52 | 1553 | 276 |
| 6,800 | 12.07 | 18.63 | 2792 | 285 |
| 10,000 | 12.06 | 50.67 | 22327 | 143 |

POWER TRANSMISSION DEVICE

CROSS-REFERENCE TO RELATED APPLICATIONS

This application claims the benefits of Japanese Patent Applications No. 2020-150936 filed on Sep. 9, 2020 in the Japanese Patent Office, the disclosures of which are herein incorporated in its entirety by reference.

BACKGROUND OF THE INVENTION

Technical Field

The present invention relates to a power transmission device.

Related Art

The power transmission device described in Japanese Laid-open patent publication NO. 2000-150277 includes a pair of coil portions disposed to face each other. Each of the coil portions includes a magnetic core formed in an annular shape, each of the magnetic cores has a plurality of grooves arranged concentrically, and a winding is accommodated in each of the grooves.

According to the study of the inventors of the present application, there is room for improvement in the structural strength of the magnetic cores in the power transmission device described in Japanese Laid-open patent publication NO. 2000-150277.

SUMMARY OF THE INVENTION

The present invention has been made in view of the above problems, and provides a power transmission device capable of sufficiently securing structural strength of a magnetic core.

According to the present invention, there is provided a power transmission device including an annular transmission unit having an annular first magnetic core and a transmission coil; and an annular reception unit having an annular second magnetic core and a reception coil, wherein the transmission unit and the reception unit are arranged to face each other, the power transmission device transmits power from the transmission unit to the reception unit,
  the transmission unit and the reception unit are relatively rotatable about a rotation axis passing through a cavity inside the transmission unit and a cavity inside the reception unit,
  the first magnetic core has a structure divided into a plurality of first split cores in a circumferential direction, and
  the second magnetic core has a structure divided into a plurality of second split cores in the circumferential direction.

According to the present invention, the structural strength of the magnetic cores can be sufficiently secured.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF EMBODIMENTS

Figure 1:
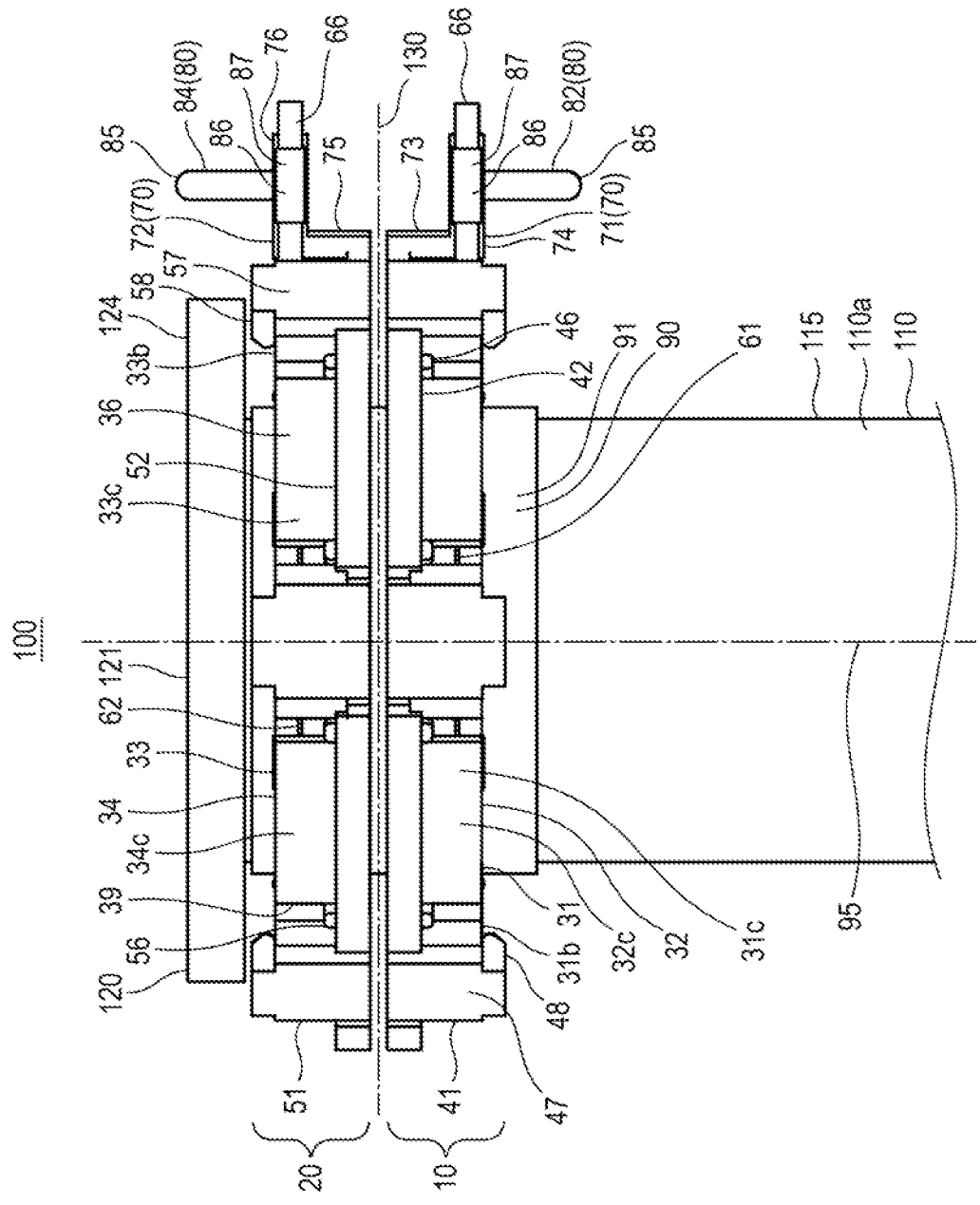
FIG. 1 is a side view of a power transmission device according to an embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, an embodiment of the present invention will be described with reference to FIGS. 1 to 8B. In all the drawings, the similar components are denoted by the same reference numerals, and the description thereof will not be repeated.

As illustrated in any one of FIGS. 1 to 6, a power transmission device 100 according to the present embodiment includes an annular transmission unit 10 having an annular first magnetic core 31 and a transmission coil 61, and an annular reception unit 20 having an annular second magnetic core 33 and a reception coil 62. The transmission unit 10 and the reception unit 20 are arranged to face each other. The power transmission device 100 transmits power from the transmission unit 10 to the reception unit 20.

Figure 4:
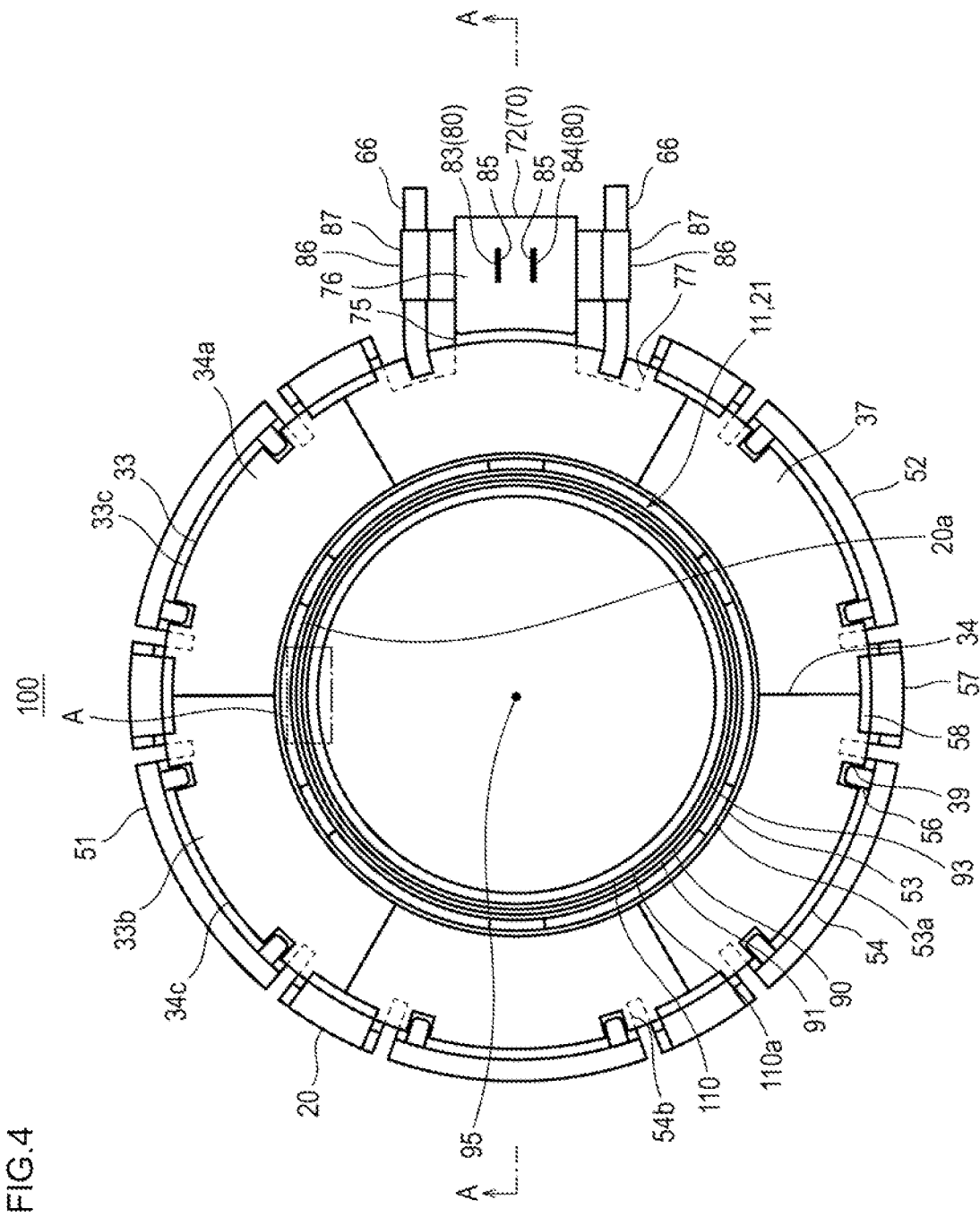
FIG. 4 is a plan view of the power transmission device according to the embodiment.
Figure 6:
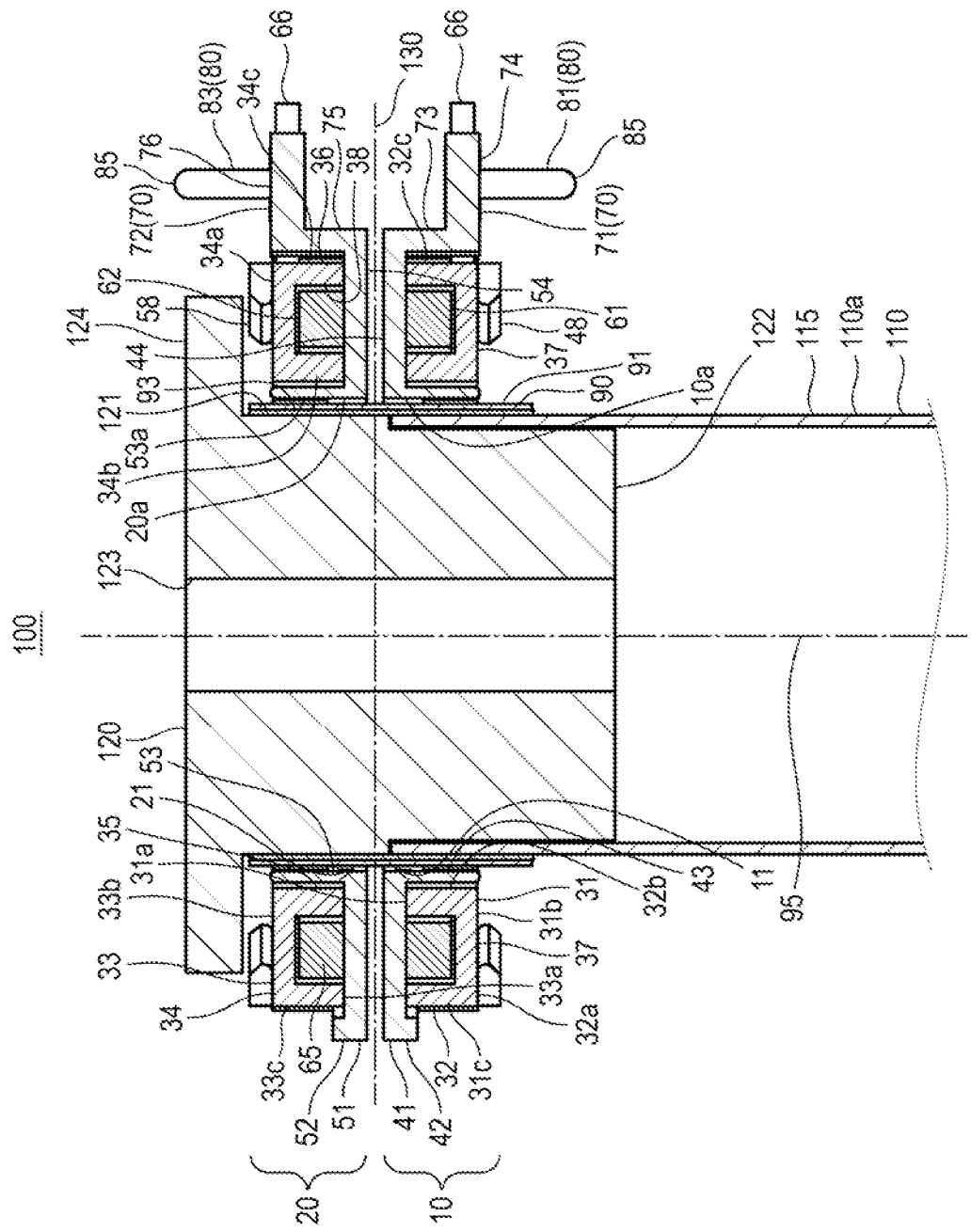
FIG. 6 is a cross-sectional view taken along line A-A of FIG. 4.

As illustrated in FIGS. 4 and 6, the transmission unit 10 and the reception unit 20 are relatively rotatable about a rotation axis 95 passing through a cavity 11 inside the transmission unit 10 and a cavity 21 inside the reception unit 20, the first magnetic core 31 has a structure divided into a plurality of first split cores 32 in a circumferential direction, and the second magnetic core 33 has a structure divided into a plurality of second split cores 34 in the circumferential direction.

According to the present embodiment, the first magnetic core 31 has the structure divided into the plurality of first split cores 32, and the second magnetic core 33 has the structure divided into the plurality of second split cores 34. That is, desired power transmission efficiency can be achieved by an aggregate of the first split cores 32 having individual dimensions smaller than those of the first magnetic core 31 and an aggregate of the second split cores 34 having individual dimensions smaller than those of the second magnetic core 33. Therefore, as compared with a case where the entire first magnetic core 31 and the entire second magnetic core 33 are integrally molded, the structural strength (fracture resistance) and durability of the first magnetic core 31 and the second magnetic core 33 can be sufficiently secured, and the ease of manufacturing the first magnetic core 31 and the second magnetic core 33 is also improved.

The transmission unit 10 and the reception unit 20 face each other with a reference plane 130 (see FIGS. 1 and 6), which is a virtual plane, interposed therebetween. More specifically, the reception unit 20 is disposed in a non-contact manner with the transmission unit 10 and is disposed in proximity to the transmission unit 10.

The rotation axis 95 is, for example, orthogonal to the reference plane 130, and is a virtual axis passing through the center of the annular transmission unit 10 and the center of the annular reception unit 20.

In the present embodiment, the reception unit 20 rotates relative to the transmission unit 10 about the rotation axis 95. Note that the relative rotation of the reception unit 20 with respect to the transmission unit 10 is freely set in each of the counterclockwise direction and the clockwise direction in the present embodiment.

Hereinafter, in order to simplify the description, the positional relationship between the components will be described on the assumption that the rotation axis 95 extends in the vertical direction (top-bottom direction). Therefore, in the following description, it is assumed that a direction orthogonal to the rotation axis 95 is a horizontal direction. In the vertical direction, a side on which the transmission unit 10 is disposed is referred to as a lower side (bottom side), and a side on which the reception unit 20 is disposed is referred to as an upper side (top side).

In a plane orthogonal to the rotation axis 95, a direction passing through the rotation axis 95 is referred to as a radial direction. Further, in the radial direction, a side close to the rotation axis 95 is referred to as a radial inner side, and a side away from the rotation axis 95 is referred to as a radial outer side.

The circumferential direction is a direction around the rotation axis 95.

The positional relationship of the respective units of the power transmission device 100 has been described in a state where the respective units of the power transmission device 100 are assembled to each other to manufacture the power transmission device 100 unless otherwise specified.

However, the direction of the rotation axis 95 when the power transmission device 100 is used is not limited to the vertical direction.

Here, as an example, the power transmission device 100 is used by being attached to a steering wheel (steering) of a vehicle such as an automobile and a portion around the steering wheel, and supplies power to various loads (not shown in the drawings) mounted on the steering wheel. That is, the reception coil 62 of the reception unit 20 is electrically connected to the loads, and supplies the power transmitted from the transmission coil 61 of the transmission unit 10 to the loads.

In the present embodiment, the transmission unit 10 and the reception unit 20 are disposed around a steering shaft 110 which is made of metal. The steering shaft 110 includes a shaft 115 formed in a cylindrical shape with the vertical direction as an axial direction, and a connecting member 120 connected to an upper end portion of the shaft 115. Here, to say that the steering shaft 110 is made of metal means that at least one of the shaft 115 and the connecting member 120 is made of metal, and preferably both the shaft 115 and the connecting member 120 are made of metal. The steering shaft 110 is inserted into the cavity 11 of the transmission unit 10 and the cavity 21 of the reception unit 20, for example, and the outer peripheral surface 110a of the steering shaft 110 faces the inner peripheral surface 10a of the transmission unit 10 and the inner peripheral surface 20a of the reception unit 20.

The steering shaft 110 is disposed coaxially with the rotation axis 95.

The steering wheel is connected to, for example, a distal end portion (upper end portion) of the steering shaft 110. Further, the steering shaft 110 is held by a base (not shown in the drawings) in a state of being rotatable about the axis of the steering shaft 110.

In the configuration of the power transmission device 100, the transmission unit 10 is provided on the base, and the reception unit 20 is provided on the steering wheel.

Therefore, when the driver of the vehicle rotates the steering wheel, the loads and the reception unit 20 rotate with the steering wheel, but the transmission unit 10 provided on the base does not rotate.

The objects to which the power transmission device 100 is attached are not limited to the steering wheel of the vehicle and the portion around the steering wheel, and the power transmission device 100 may be attached to other devices. Examples of the other devices include an amusement device such as a game machine and a device having a steering wheel, such as a simulator. However, each of the other devices may be a device that does not have a steering wheel but has two parts that are relatively rotatable, or may be a device in which two parts are relatively rotatably connected without using the steering shaft 110.

In addition, the power transmission device 100 may be provided as, for example, a steering component having a configuration in which the reception unit 20 is incorporated in a steering wheel in advance.

As illustrated in FIGS. 1 and 6, the transmission unit 10 and the reception unit 20 are formed vertically symmetrically with respect to the reference plane 130.

More specifically, as illustrated in FIG. 6, the reception unit 20 is disposed above the transmission unit 10.

In the following, first, of the transmission unit 10 and the reception unit 20, the reception unit 20 will be described in detail.

Figure 3:
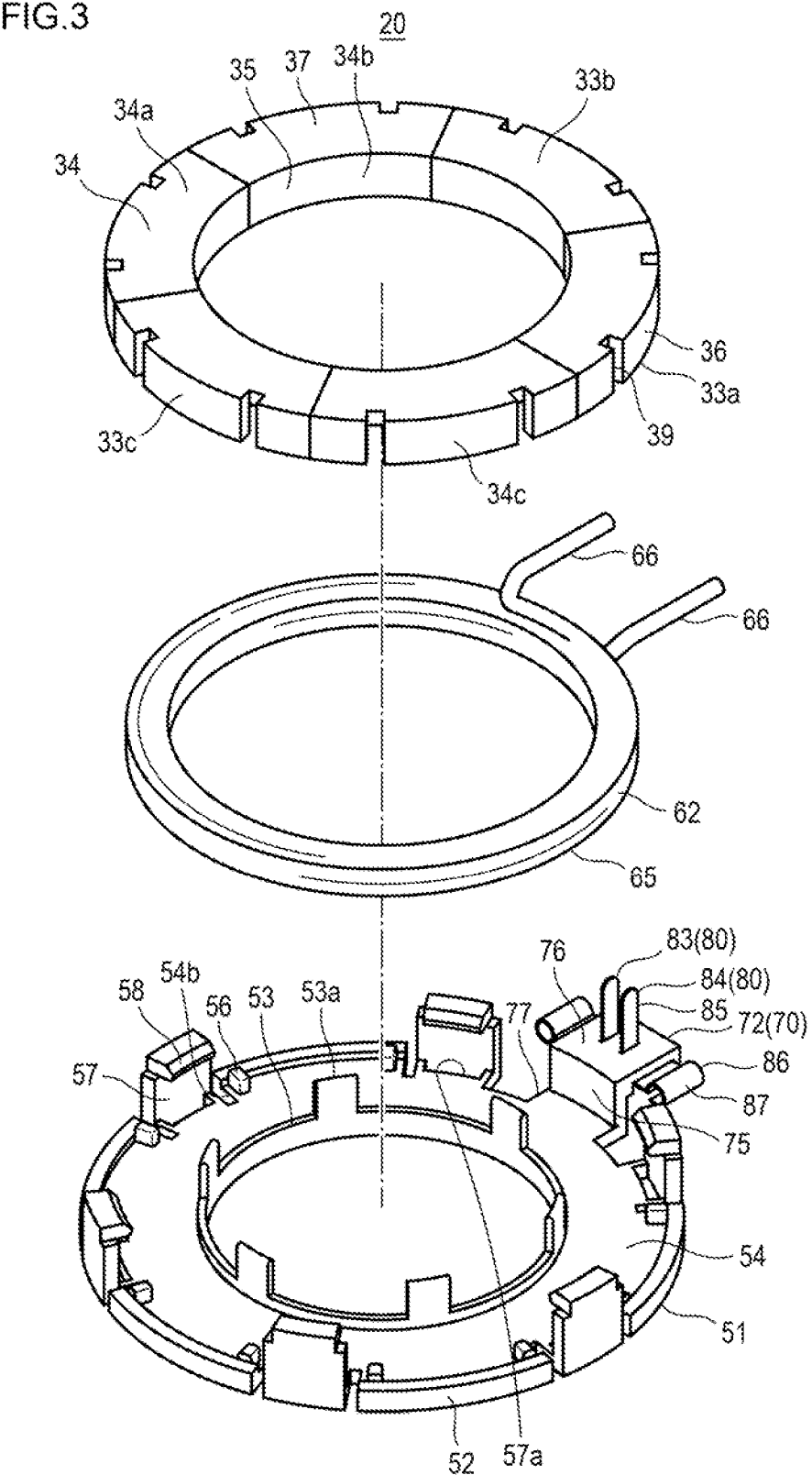
FIG. 3 is an exploded perspective view of a reception unit in the embodiment.

As illustrated in FIGS. 3, 4, and 6, in the present embodiment, the second magnetic core 33 is formed in, for example, an annular shape in plan view.

More specifically, the second magnetic core 33 includes a plate-shaped portion 37 having an annular shape in plan view centered on the rotation axis 95, an inner peripheral wall portion 35 protruding downward from an inner peripheral edge portion of the plate-shaped portion 37, and an outer peripheral wall portion 36 protruding downward from an outer peripheral edge portion of the plate-shaped portion 37.

Each of the upper surface and the lower surface of the plate-like portion 37 is formed flat, for example, and is arranged horizontally.

Each of the inner peripheral wall portion 35 and the outer peripheral wall portion 36 is formed in, for example, a cylindrical shape with the vertical direction as the axial direction, and protrudes from the lower surface of the plate-shaped portion 37.

In the present embodiment, the plate-shaped portion 37, the inner peripheral wall portion 35, and the outer peripheral wall portion 36 are arranged concentrically around the rotation axis 95 in plan view.

The outer diameter of the plate-shaped portion 37 is set to be equal to the outer diameter of the outer peripheral wall portion 36, and the inner diameter of the plate-shaped portion 37 is set to be equal to the inner diameter of the inner peripheral wall portion 35.

The height position of the lower end surface of the inner peripheral wall portion 35 and the height position of the lower end surface of the outer peripheral wall portion 36 are set to the same height position.

In the present embodiment, the inner peripheral wall portion 35, the outer peripheral wall portion 36, and the plate-shaped portion 37 constitute a groove portion 38 having an annular shape in plan view, and the groove portion 38 is opened downward, for example.

In addition, one surface (hereinafter, it may be referred to as a first surface 33a) of the second magnetic core 33 is constituted by the lower end surface of the inner peripheral wall portion 35 and the lower end surface of the outer peripheral wall portion 36, and a surface (hereinafter, it may be referred to as a second surface 33b) of the second magnetic core 33 opposite to the one surface 33a is constituted by the upper surface of the plate-shaped portion 37.

As described above, the second magnetic core 33 has the structure divided into the plurality of second split cores 34.

As illustrated in FIGS. 3 and 4, each of the second split cores 34 is formed in, for example, a shape obtained by dividing the second magnetic core 33 into six equal parts in the circumferential direction. That is, the planar shape of each of the second split cores 34 is formed in a fan shape having a central angle of 60 degrees, and the second magnetic core 33 is constituted by an aggregate of the six second split cores 34.

However, the number of second split cores 34 included in the second magnetic core 33 is not limited to the above-described example, and may be at least two or more.

Each of the second split cores 34 includes, for example, a plate-shaped portion 34a formed in a shape obtained by dividing an annular ring centered on the rotation axis 95 into six equal parts, that is, a fan shape having a central angle of 60 degrees in plan view, an inner peripheral wall portion 34b protruding downward from an inner peripheral edge of the plate-shaped portion 34a, and an outer peripheral wall portion 34c protruding downward from an outer peripheral edge of the plate-shaped portion 34a.

An aggregate of the plate-shaped portions 34a constitutes the plate-shaped portion 37 of the second magnetic core 33. An aggregate of the inner peripheral wall portions 34b constitutes the inner peripheral wall portion 35 of the second magnetic core 33, and an aggregate of the outer peripheral wall portions 34c constitutes the outer peripheral wall portion 36 of the second magnetic core 33.

Therefore, a combined portion of an aggregate of the lower end surfaces of the inner peripheral wall portions 34b and an aggregate of the lower end surfaces of the outer peripheral wall portions 34c constitute the first surface 31a of the second magnetic core 33. An aggregate of the upper surfaces of the plate-shaped portions 34a constitutes the second surface 33b of the second magnetic core 33.

Here, a gap is preferably formed between the second split cores 34 in the circumferential direction, but the gap may not be formed.

In addition, in the present embodiment, a pair of notch-shaped portions 39 is formed in the outer peripheral wall portion 34c of each of the second split cores 34, and a second engagement protrusion 56 described later is engaged with each of the notch-shaped portions 39.

Each of the notch-shaped portions 39 is formed, for example, at one portion in the circumferential direction of the outer peripheral wall portion 34c.

Each of the notch-shaped portions 39 is formed, for example, from the upper end to the lower end of the outer peripheral wall portion 34c, and penetrates the outer peripheral wall portion 34c in the thickness direction (radial direction).

Here, in the present embodiment, the reception unit 20 includes a resin-made second holder member 51 that holds the second magnetic core 33.

Figure 2:
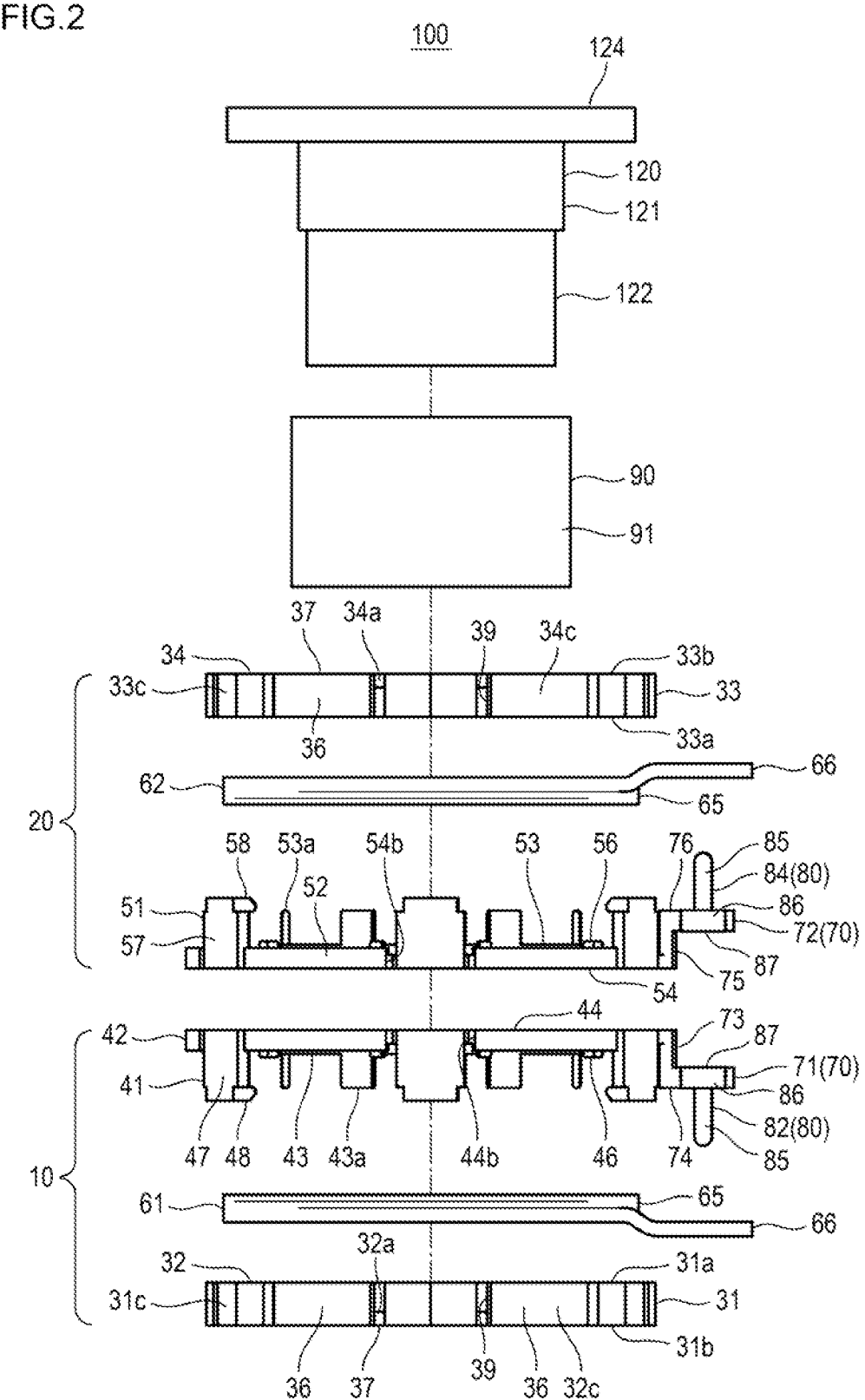
FIG. 2 is an exploded side view of the power transmission device according to the embodiment.

As illustrated in FIGS. 2 and 6, the second holder member 51 includes, for example, second upright wall portions 57 disposed along the outer peripheral surface 33c of the second magnetic core 33, and the second upright wall portions 57 are disposed at a plurality of locations in the circumferential direction.

More specifically, the second holder member 51 has, for example, a second annular portion 54 formed in a substantially annular shape centered on the rotation axis 95 in plan view.

Each of the upper surface and the lower surface of the second annular portion 54 is, for example, formed flat and arranged horizontally.

Each of the second upright wall portions 57 stands upward from, for example, an outer peripheral edge portion of the upper surface of the second annular portion 54.

For example, the second upright wall portions 57 are formed in the same size and shape and are intermittently disposed in the circumferential direction.

Each of the second upright wall portions 57 is formed in, for example, an arc shape centered on the rotation axis 95 in plan view.

The outer peripheral surface of each of the second upright wall portions 57 is on the same cylindrical surface as the outer peripheral surface of the second annular portion 54.

The height position of the upper end of each of the second upright wall portions 57 excluding the second engagement claw portion 58, which will be described later, is set to a height position substantially equivalent to the height position of the second surface 33b of the second magnetic core 33.

Here, in the present embodiment, each of the second upright wall portions 57 has, for example, a second engagement claw portion 58 that engages with the second surface 33b of the second magnetic core 33.

More specifically, the common second engagement claw portion 58 is engaged with two adjacent second split cores 34 among the plurality of second split cores 34 of the second magnetic core 33.

More specifically, each of the second engagement claw portions 58 is formed, for example, at the upper end portion of each second upright wall portion 57. Each of the second engagement claw portions 58 protrudes inward in the radial direction from the upper end of the portion of each of the second upright wall portions 57 excluding the second engagement claw portion 58, and extends in the circumferential direction.

In the radial direction, the tip of each of the second engagement claw portions 58 is disposed inside the inner peripheral surface of the corresponding second upright wall portion 57 excluding the second engagement claw portion 58.

The dimension of each of the second engagement claw portions 58 in the circumferential direction is set to be smaller than the dimension of each of the second upright wall portions 57 excluding the second engagement claw portion 58 in the circumferential direction.

The upper surface and the lower surface of each of the second engagement claw portions 58 are formed substantially flat and arranged horizontally. However, for example, a chamfered portion is formed in the distal end side portion (distal end in the protruding direction) of each of the second engagement claw portions 58. The upper portion of each of the chamfered portions has, for example, a C-chamfered shape. As a result, each of the second engagement claw portions 58 can be smoothly engaged with the second surface 33b of the second magnetic core 33. The lower portion of each of the chamfered portions has, for example, a rounded chamfered shape. As a result, the contact of the second engagement claw portions 58 with the second magnetic core 33 can be made soft.

In a state where the second engagement claw portions 58 are engaged with the second surface 33b of the second magnetic core 33, the lower surfaces of the second engagement claw portions 58 are in contact with the upper surface of the plate-shaped portion 37 of the second magnetic core 33.

Furthermore, the second holder member 51 includes, for example, a plurality of second outer peripheral edge portions 52 arranged along the outer peripheral surface 33c of the second magnetic core 33. Each of the second outer peripheral edge portions 52 is arranged between two second upright wall portions 57 adjacent to each other in the circumferential direction among the second upright wall portions 57. More specifically, the second outer peripheral edge portions 52 and the second upright wall portions 57 are alternately arranged in the circumferential direction.

The second outer peripheral edge portions 52 are formed to have the same size and shape, for example.

Each second outer peripheral edge portion 52 is formed in, for example, an arc shape centered on the rotation axis 95 in plan view, and slightly stands upward from the outer peripheral edge portion of the upper surface of the second annular portion 54.

The outer peripheral surface of each of the second outer peripheral edge portions 52 is disposed on the same cylindrical surface as the outer peripheral surface of the second annular portion 54 and the outer peripheral surface of each of the second upright wall portions 57.

The thickness dimension (dimension in the radial direction) of each second outer peripheral edge portion 52 is set to a dimension equivalent to the thickness dimension (dimension in the radial direction) of each second upright wall portion 57.

The height position of the upper end surface of each of the second outer peripheral edge portions 52 is, for example, lower than the height position of the upper end surface of each of the second upright wall portions 57.

The second outer peripheral edge portions 52 and the second upright wall portions 57 are disposed apart from each other in the circumferential direction, and a slit portion 54b (see FIG. 4) is formed in each of gaps between the second outer peripheral edge portions 52 and the second upright wall portions 57 in the circumferential direction.

The slit portion 54b extends, for example, in the radial direction. The slit portion 54b vertically penetrates the second annular portion 54 and is opened outward in the radial direction.

Further, the second holder member 51 has an opening portion 57a (see FIG. 3) formed along the inner peripheral surface of each of the second upright wall portions 57. The opening portion 57a extends, for example, in the circumferential direction and penetrates the second annular portion 54 in the vertical direction. In the circumferential direction, the length dimension of the opening portion 57a is, for example, smaller than the length dimension of each of the second upright wall portions 57.

According to the above configuration, since the second holder member 51 can be easily elastically deformed in the radial direction, the second magnetic core 33 can be suitably accommodated inside the second holder member 51. More specifically, when the second magnetic core 33 is attached to the second holder member 51, the second holder member 51 is easily elastically deformed (expanded in diameter) toward the radial outer side, and after the attachment of the second magnetic core 33 is completed, the second holder member 51 is satisfactorily elastically restored (reduced in diameter) toward the radial inner side.

The number of second upright wall portions 57 is 6, for example. On the other hand, the number of second outer peripheral edge portions 52 is 5, for example. As illustrated in FIGS. 3 and 4, in the present embodiment, the second outer peripheral edge portion 52 is not disposed at one of gap between the two second upright wall portions 57 adjacent to each other in the circumferential direction, and instead, a second terminal holding portion 72 described later is disposed at the gap.

Here, in the present embodiment, the second holder member 51 has, for example, the second engagement protrusions 56 that engage with the second split cores 34, and positional displacements of the second split cores 34 in the circumferential direction are restricted by the second engagement protrusions 56.

More specifically, the second engagement protrusions 56 are formed to have the same size and shape, for example.

Each of the second engagement protrusions 56 protrudes upward from the upper surface of the second annular portion 54 in the vicinity of the outer peripheral edge portion of the upper surface of the second annular portion 54.

Each of the second engagement protrusions 56 is formed in, for example, a substantially rectangular parallelepiped shape whose dimension in the radial direction is longer than the dimension in the circumferential direction. The width dimension of each of the second engagement protrusions 56 is set to be substantially constant in the circumferential direction. One surface in the radial direction of each of the second engagement protrusions 56 is connected to the inner peripheral surface of the second outer peripheral edge portion 52.

As a result, even if the position of the second split core 34 is displaced in the radial direction, the second engagement protrusions 56 can be satisfactorily engaged with the notch-shaped portions 39 of the second split core 34.

Further, the height position of the upper end of each of the second engagement protrusions 56 is preferably higher than the height position of the upper end surface of each of the second outer peripheral edge portions 52, for example. As a result, the engagement of the second engagement protrusions 56 with the second magnetic core 33 is improved.

In the present embodiment, as an example, individual second engagement protrusions 56 are connected to both end portions (both end portions in the circumferential direction) of one second outer peripheral edge portion 52. Therefore, the number of second engagement protrusions 56 included in the second holder member 51 is 10, for example.

Here, as described above, a pair of notch-shaped portions 39 is formed in each second split core 34, and each second engagement protrusion 56 is engaged with the corresponding notch-shaped portion 39. However, in the present embodiment, the number of second engagement protrusions 56 included in the second holder member 51 is 10, whereas the number of second split cores 34 included in the second magnetic core 33 is 6. Therefore, the second engagement protrusions 56 are not engaged with the notch-shaped portions 39 of any one of the six second split cores 34, and instead, extended wiring portions 66 (described in detail later) of the reception coil 62 are extended to the outside of the second magnetic core 33 through the notch-shaped portions 39.

In addition, the second holder member 51 includes, for example, a second inner peripheral edge portion 53 disposed along the inner peripheral surface of the second magnetic core 33, and a plurality of upright portions 53a standing upward from the upper end of the second inner peripheral edge portion 53.

The second inner peripheral edge portion 53 slightly stands upward from the inner peripheral edge portion of the upper surface of the second annular portion 54, for example, and is formed in a circular shape.

For example, the upright portions 53a are intermittently disposed in the circumferential direction.

Each upright portion 53a is formed in, for example, an arc shape centered on the rotation axis 95 in plan view.

Each of the inner peripheral surface of the second inner peripheral edge portion 53 and the inner peripheral surface of each upright portion 53a is disposed, for example, on the same cylindrical surface as the inner peripheral surface of the second annular portion 54.

The height position of the upper end of each upright portion 53a is, for example, substantially equal to or higher than the height position of the second surface 33b of the second magnetic core 33.

Since the upright portions 53a are formed, when the steering shaft 110 is inserted into the cavity 11 of the transmission unit 10, the steering shaft 110 is guided by the upright portions 53a and smoothly inserted into the power transmission device 100. Further, the steering shaft 110 and the second magnetic core 33 can be prevented from interfering with each other by the upright portions 53a.

In the present embodiment, the number of upright portions 53a of the second holder member 51 is 6, for example.

Further, the second holder member 51 includes, for example, a second terminal holding portion 72 that holds a terminal portion 80 described later.

More specifically, the second terminal holding portion 72 includes, for example, an arc-shaped fourth upright wall portion 75 standing upward from the upper surface of the outer peripheral edge portion of the second annular portion 54, and a flat plate-shaped second plate-shaped portion 76 protruding outward in the radial direction from the upper edge portion of the fourth upright wall portion 75.

The fourth upright wall portion 75 is formed in, for example, an arc shape centered on the rotation axis 95 in plan view.

In addition, notch-shaped portions 77 (see FIG. 4) are formed between the fourth upright wall portion 75 and the second upright wall portions 57 in the circumferential direction.

In the present embodiment, the outer peripheral surface of the fourth upright wall portion 75 is disposed on the same cylindrical surface as the outer peripheral surfaces of the second outer peripheral edge portions 52.

The thickness dimension (dimension in the radial direction) of the fourth upright wall portion 75 is set to, for example, a dimension equivalent to the thickness dimension (dimension in the radial direction) of each second outer peripheral edge portion 52.

The second plate-shaped portion 76 is formed in, for example, a substantially rectangular shape in plan view.

The upper surface and the lower surface of the second plate-shaped portion 76 are arranged horizontally, for example. The height position of the upper surface of the second plate-shaped portion 76 is set to be equal to the height position of the upper end of the portion of each of the second upright wall portions 57 excluding the second engagement claw portion 58, for example.

The inner peripheral surface of the fourth upright wall portion 75 is disposed, for example, along the outer peripheral surface of any one of the six second split cores 34. More specifically, among the six second split cores 34, the second split core 34 with which the second engagement protrusion 56 is not engaged is arranged side by side with the fourth upright wall portion 75 in the radial direction.

As described above, the transmission unit 10 is formed to be vertically symmetric with the reception unit 20 with respect to the reference plane 130. Therefore, similarly to the second magnetic core 33, the first magnetic core 31 of the transmission unit 10 includes a plate-shaped portion 37, an inner peripheral wall portion 35, and an outer peripheral wall portion 36.

One surface (hereinafter, it may be referred to as a first surface 31a) of the first magnetic core 31 is constituted by the upper end surface of the inner peripheral wall portion 35 of the first magnetic core 31 and the upper end surface of the outer peripheral wall portion 36 of the first magnetic core 31, and a surface (hereinafter, it may be referred to as a second surface 31b) of the first magnetic core 31 opposite to the one surface (the first surface 31a) of the first magnetic core 31 is constituted by the lower surface of the plate-shaped portion 37 of the first magnetic core 31.

Figure 5:
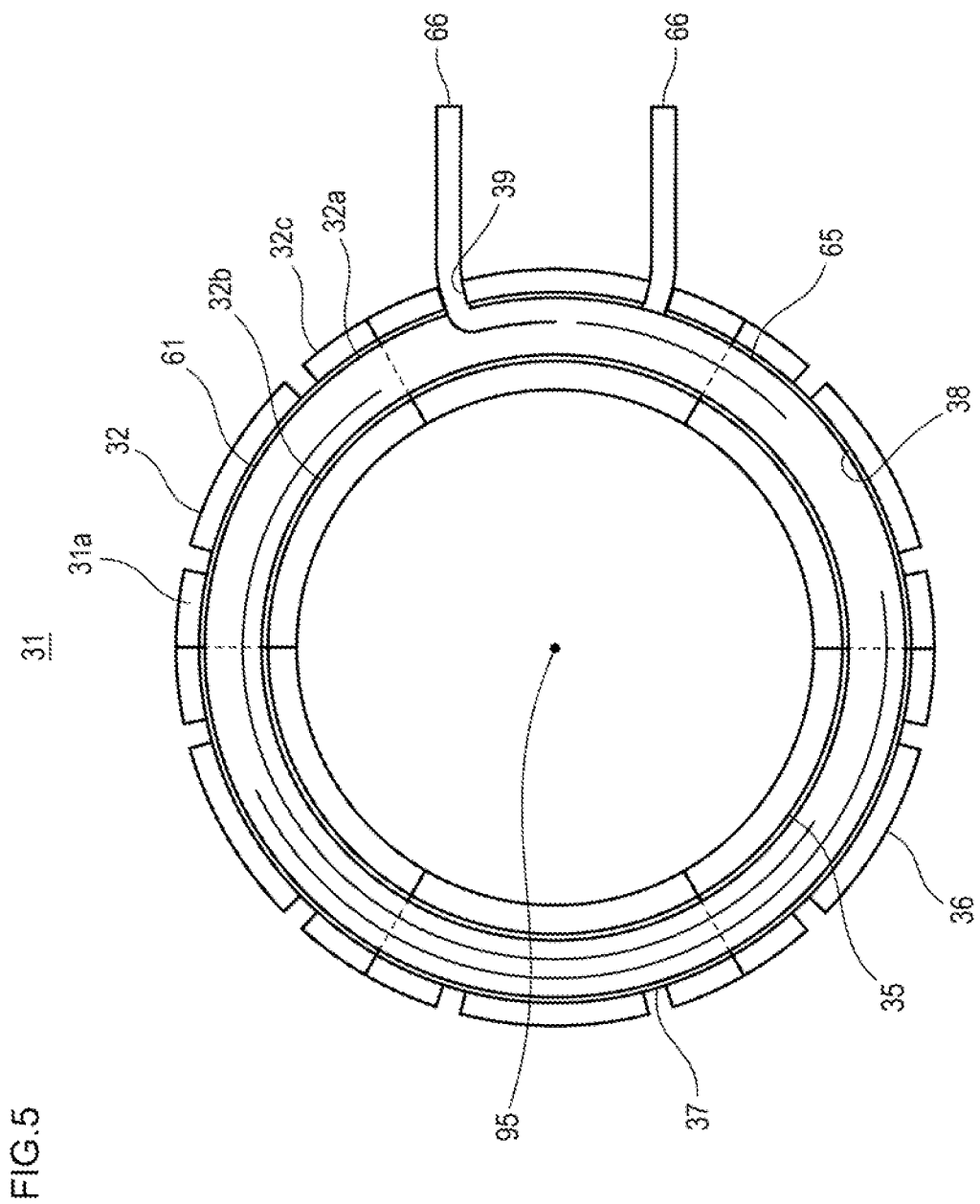
FIG. 5 is a plan view of a first magnetic core and a transmission coil in the embodiment.

Similarly to the second split cores 34, each of the first split cores 32 is formed in, for example, a shape obtained by dividing the first magnetic core 31 into six equal parts in the circumferential direction, and includes a plate-shaped portion 32a similar to the plate-shaped portion 34a, an inner peripheral wall portion 32b similar to the inner peripheral wall portion 34b, and an outer peripheral wall portion 32c similar to the outer peripheral wall portion 34c (see FIG. 5).

Similarly to the second split cores 34, a pair of notch-shaped portions 39 is formed in the outer peripheral wall portion 32c of each of the first split cores 32, and each first engagement protrusion 46 (described later) of a first holder member 41 (described later) is engaged with the notch-shaped portions 39 of the corresponding first split cores 32. In addition, the first engagement protrusions 46 are not engaged with the notch-shaped portions 39 of any one of the six first split cores 32, and instead, extended wiring portions 66 (described in detail later) of the transmission coil 61 are extended to the outside of the first magnetic core 31 through the notch-shaped portions 39.

Further, the transmission unit 10 includes a first holder member 41 similar to the second holder member 51. Therefore, the first holder member 41 includes a first annular portion 44 similar to the second annular portion 54, first engagement protrusions 46 similar to the second engagement protrusions 56, first upright wall portions 47 similar to the second upright wall portions 57, first outer peripheral edge portions 42 similar to the second outer peripheral edge portions 52, a first inner peripheral edge portion 43 similar to the second inner peripheral edge portion 53, and upright portions 43a similar to the second upright portions 53a.

The first holder member 41 further includes a first terminal holding portion 71 that holds a terminal portion 80. Similarly to the second terminal holding portion 72, the first terminal holding portion 71 has, for example, a third upright wall portion 73 similar to the fourth upright wall portion 75 and a first plate-shaped portion 74 similar to the second plate-shaped portion 76.

The inner peripheral surface of the third upright wall portion 73 is disposed, for example, along the outer peripheral surface of any one of the six first split cores 32 of the first magnetic core 31. More specifically, among the six first split cores 32, the first split core 32 with which the above-described first engagement protrusion 46 is not engaged is arranged side by side with the third upright wall portion 73 in the radial direction.

As described above, the transmission unit 10 includes the first holder member 41 made of resin that holds the first magnetic core 31, the reception unit 20 includes the second holder member 51 made of resin that holds the second magnetic core 33, the first holder member 41 has an annular shape and is arranged along one surface (the first surface 31a) of the first magnetic core 31 in the axial direction, and the second holder member 51 has an annular shape and is arranged along the one surface (first surface 33a) of the second magnetic core 33 in the axial direction.

As a result, since the separation distance between the first magnetic core 31 and the second magnetic core 33 can be kept constant, more stable characteristics of the power transmission device 100 can be achieved.

As described above, the first magnetic core 31 has the structure divided into the plurality of first split cores 32, and the second magnetic core 33 has the structure divided into the plurality of second split cores 34. As a result, for example, when a temperature changes in the environment around the power transmission device 100, even if thermal stress occurs in the first magnetic core 31 due to thermal deformation of the first holder member 41 due to a difference in thermal expansion coefficient between the first magnetic core 31 and the first holder member 41, the thermal stress can be reduced by enlarging or reducing gaps between the first split cores 32. Similarly, even if thermal stress occurs in the second magnetic core 33 due to thermal deformation of the second holder member 51, the thermal stress can be reduced by enlarging or reducing gaps between the second split cores 34. Therefore, more stable characteristics of the power transmission device 100 can be achieved. In addition, it is possible to improve the fracture resistance of the first magnetic core 31 and the second magnetic core 33.

In addition, the first holder member 41 includes the first engagement protrusions 46 that engage with the first split cores 32, and the first engagement protrusions 46 restrict positional displacements of the first split cores 32 in the circumferential direction. The second holder member 51 includes, for example, the second engagement protrusions 56 that engage with the second split cores 34, and the second engagement protrusions 56 restrict positional displacements of the second split cores 34 in the circumferential direction.

In addition, the first holder member 41 has, for example, the first upright wall portions 47 arranged along the outer peripheral surface 31c of the first magnetic core 31. The first upright wall portions 47 are arranged at a plurality of locations in the circumferential direction. The second holder member 51 has, for example, the second upright wall portions 57 arranged along the outer peripheral surface 33c of the second magnetic core 33, and the second upright wall portions 57 are arranged at a plurality of locations in the circumferential direction.

In addition, each of the first upright wall portions 47 has a first engagement claw portion 48 that engages with the surface (second surface 31b) opposite to the one surface (first surface 31a) of the first magnetic core 31, and each of the second upright wall portions 57 has, for example, a second engagement claw portion 58 that engages with the surface (second surface 33b) opposite to the one surface (first surface 33a) of the second magnetic core 33.

That is, the first holder member 41 has the first upright wall portions 47 arranged along the outer peripheral surface 31c of the first magnetic core 31, and each of the first upright wall portions 47 has the first engagement claw portion 48 that engages with the surface (the second surface 31b) opposite to the one surface (the first surface 31a) of the first magnetic core 31. The second holder member 51 has the second upright wall portions 57 arranged along the outer peripheral surface 33c of the second magnetic core 33, and each of the second upright wall portions 57 has the second engagement claw portion 58 that engages with the surface (the second surface 33b) opposite to the one surface (the first surface 33a) of the second magnetic core 33.

As a result, the first magnetic core 31 can be favorably held by the first holder member 41, and the second magnetic core 33 can be favorably held by the second holder member 51.

Further, the common first engagement claw portion 48 is engaged with two first split cores 32 adjacent to each other among the plurality of first split cores 32 of the first magnetic core 31, and the common second engagement claw portion 58 is engaged with two second split cores 34 adjacent to each other among the plurality of second split cores 34 of the second magnetic core 33.

As a result, a state in which each of the first split cores 32 is held by the first holder member 41 can be favorably maintained by a smaller number of the first engagement claw portions 48, and a state in which each of the second split cores 34 is held by the second holder member 51 can be favorably maintained by a smaller number of the second engagement claw portions 58.

In addition, the height positions (positions in the vertical direction) of the upper surfaces of the second split cores 34 adjacent to each other can be aligned. Similarly, the height positions (positions in the vertical direction) of the lower surfaces of the first split cores 32 adjacent to each other can be aligned.

In the present embodiment, the inner diameter of each of the first magnetic core 31 and the second magnetic core 33 is larger than the outer diameter of each of the first inner peripheral edge portion 43 and the second inner peripheral edge portion 53. The outer diameter of each of the first magnetic core 31 and the second magnetic core 33 is smaller than the inner diameter of each of the first outer peripheral edge portions 42 and the second outer peripheral edge portions 52.

The height position of the upper end of each of the second inner peripheral edge portion 53 and the second outer peripheral edge portions 52 is lower than the height position of the upper surface of the plate-shaped portion 37 of the second magnetic core 33. The height position of the lower end of each of the first inner peripheral edge portion 43 and the first outer peripheral edge portions 42 is higher than the height position of the lower surface of the plate-shaped portion 37 of the first magnetic core 31.

As illustrated in FIG. 6, the second magnetic core 33 is disposed between the second outer peripheral edge portions 52 and the second inner peripheral edge portion 53. More specifically, the outer peripheral surface 33c of the second magnetic core 33 is disposed along the inner peripheral surfaces of the second outer peripheral edge portions 52, and the inner peripheral surface of the second magnetic core 33 is disposed along the outer peripheral surfaces of the second inner peripheral edge portions 53. That is, the second magnetic core 33 is arranged concentrically with the second outer peripheral edge portions 52 and the second inner peripheral edge portion 53. The first surface 33a of the second magnetic core 33 is in surface contact with the upper surface of the second annular portion 54.

Similarly, the first magnetic core 31 is disposed between the first outer peripheral edge portions 42 and the first inner peripheral edge portion 43. More specifically, the outer peripheral surface 31c of the first magnetic core 31 is disposed along the inner peripheral surfaces of the first outer peripheral edge portions 42, and the inner peripheral surface of the first magnetic core 31 is disposed along the outer peripheral surface of the first inner peripheral edge portion 43. That is, the first magnetic core 31 is arranged concentrically with the first outer peripheral edge portions 42 and the first inner peripheral edge portion 43. The first surface 31a of the first magnetic core 31 is in surface contact with the lower surface of the first annular portion 44.

Furthermore, in the present embodiment, the cavity 11 inside the transmission unit 10 is defined by the inner peripheral surface 10a of the transmission unit 10, and the inner peripheral surface 10a of the transmission unit 10 is constituted by the inner peripheral surface of the first annular portion 44, the inner peripheral surfaces of the first inner peripheral edge portions 43, and the inner peripheral surfaces of the upright portions 43a.

Similarly, the cavity 21 inside the reception unit 20 is defined by the inner peripheral surface 20a of the reception unit 20, and the inner peripheral surface 20a of the reception unit 20 is constituted by the inner peripheral surface of the second annular portion 54, the inner peripheral surfaces of the second inner peripheral edge portions 53, and the inner peripheral surfaces of the upright portions 53a.

Further, the outer peripheral surface of the transmission unit 10 is constituted by the outer peripheral surface of the first annular portion 44, the outer peripheral surfaces of the first upright wall portions 47, and the outer peripheral surfaces of the first outer peripheral edge portions 42, and the outer peripheral surface of the reception unit 20 is constituted by the outer peripheral surface of the second annular portion 54, the outer peripheral surfaces of the second upright wall portions 57, and the outer peripheral surfaces of the second outer peripheral edge portions 52.

Here, the thickness dimension (dimension in the radial direction) of each of the first inner peripheral edge portion 43 and the upright portions 43a is smaller than the thickness dimension (dimension in the radial direction) of each of the first outer peripheral edge portions 42, for example. Similarly, the thickness dimension (dimension in the radial direction) of each of the second inner peripheral edge portion 53 and the upright portions 53a is smaller than the thickness dimension (dimension in the radial direction) of the second outer peripheral edge portion 52, for example.

As a result, it is possible to sufficiently secure the diameters of the cavities 11 and 21 without changing each of the outer diameter of the transmission unit 10 and the outer diameter of the reception unit 20.

In the present embodiment, each of the transmission coil 61 and the reception coil 62 is made of, for example, an insulation-coated metal wire. Each of the transmission coil 61 and the reception coil 62 includes a winding portion 65 formed by winding the wire around the inner peripheral wall portion 35, and a pair of extended wiring portions 66 constituted by both end portions of the wire.

The winding portion 65 of the reception coil 62 is accommodated inside the groove portion 38 of the second magnetic core 33, and the opening of the groove portion 38 is closed by the second annular portion 54. Similarly, the winding portion 65 of the transmission coil 61 is accommodated inside the groove portion 38 of the first magnetic core 31, and the opening of the groove portion 38 is closed by the first annular portion 44.

Each extended wiring portion 66 of the reception coil 62 is extended to the outside of the outer peripheral wall portion 36 through, for example, the notch-shaped portion 39 of the second split core 34 disposed to face the above-described second terminal holding portion 72.

Similarly, each extended wiring portion 66 of the transmission coil 61 is extended to the outside of the outer peripheral wall portion 36 through, for example, the notch-shaped portion 39 of the first split core 32 disposed to face the above-described first terminal holding portion 71.

Here, the reception coil 62 and the second magnetic core 33 may be fixed to each other by, for example, a double-sided adhesive tape (not shown in the drawings).

The double-sided fixing tape is formed in, for example, an annular shape substantially the same as the plate-shaped portion 37 of the second magnetic core 33 in plan view. It is also preferable that each of the second split cores 34 is disposed in a circumferential shape along the fixing tape. With this configuration, it is possible to suppress relative displacement between the second split cores 34.

Similarly, the transmission coil 61 and the first magnetic core 31 may be fixed to each other by, for example, a double-sided adhesive tape (not shown in the drawings).

In the present embodiment, as illustrated in FIGS. 1, 2, 3, and 4, the power transmission device 100 includes, for example, a first terminal portion 81, a second terminal portion 82, a third terminal portion 83, and a fourth terminal portion 84 as the terminal portion 80.

Each of the first terminal portion 81 and the second terminal portion 82 is held by the first terminal holding portion 71 of the first holder member 41 and is electrically connected to the transmission coil 61. Each of the third terminal portion 83 and the fourth terminal portion 84 is held by the second terminal holding portion 72 of the second holder member 51 and is electrically connected to the reception coil 62.

The first to fourth terminal portions 81 to 84 are formed by, for example, bending a long plate-like metal member (at, for example, it is bent 90 degrees).

More specifically, the third terminal portion 83 has an L shape in front view and has a vertical portion extending in the vertical direction and a horizontal portion extending in the horizontal direction from the lower end of the vertical portion. The vertical portion is an external terminal 85 externally connected when the power transmission device 100 is mounted, and the horizontal portion is a crimp terminal 86 to which the extended wiring portion 66 of the reception coil 62 is fixed.

The lower portion of the external terminal 85 of the third terminal portion 83 is embedded in the second plate-shaped portion 76 of the second terminal holding portion 72, and the upper portion of the external terminal 85 is exposed to the outside from the upper surface of the second plate-shaped portion 76.

On the other hand, the crimp terminal 86 extends horizontally along the lower surface of the second plate-shaped portion 76 (Approximately extending in the tangential direction of the outer circumference of the second annular portion 54 in a plan view).

Furthermore, in the present embodiment, a groove portion (not shown in the drawings) having a shape corresponding to the crimp terminal 86 of the third terminal portion 83 is formed on the lower surface of the second plate-shaped portion 76. A portion of the crimp terminal 86 of the third terminal portion 83 is accommodated in the groove portion and is arranged horizontally along the bottom surface of the groove portion.

Further, the tip portion (the end portion on the side opposite to the external terminal 85 side) of the crimp terminal 86 constitutes a fitting portion 87 curved in a substantially cylindrical shape whose axial direction is horizontal and is orthogonal to the extending direction of the crimp terminal 86.

By closing the distal end of the fitting portion 87 and the proximal end of the fitting portion 87 in a state where one extended wiring portion 66 of the pair of extended wiring portions 66 of the reception coil 62 is inserted into the inner cavity of the fitting portion 87, the extended wiring portion 66 can be fitted to the fitting portion 87. That is, by swaging the fitting portion 87, the extended wiring portion 66 can be fixed to the crimp terminal 86 in a state of being inserted into the inner cavity of the fitting portion 87. In this state, for example, welding fixation or soldering fixation is further performed.

For example, the fourth terminal portion 84 is formed in a symmetrical shape with the third terminal portion 83 with respect to a plane including a radial direction of the second holder member 51 toward from the rotation axis 95 to the second terminal holding portion 72 and the rotation axis 95. Therefore, similarly to the third terminal portion 83, the fourth terminal portion 84 includes an external terminal 85, a crimp terminal 86, and a fitting portion 87.

The other extended wiring portion 66 (the extended wiring portion 66 that is not connected to the third terminal portion 83) of the pair of extended wiring portions 66 of the reception coil 62 is fixed to the crimp terminal 86 at the fitting portion 87, similarly to the third terminal portion 83.

A groove portion (not shown in the drawings) having a shape corresponding to the crimp terminal 86 of the fourth terminal portion 84 is formed on the lower surface of the second plate-shaped portion 76. A portion of the crimp terminal 86 of the fourth terminal portion 84 is accommodated in the groove portion and is arranged horizontally along the bottom surface of the groove portion.

For example, the first terminal portion 81 is formed in a vertically symmetrical shape with the third terminal portion 83. Therefore, similarly to the third terminal portion 83, the first terminal portion 81 includes an external terminal 85, a crimp terminal 86, and a fitting portion 87.

Similarly to the third terminal portion 83, one extended wiring portion 66 of the pair of extended wiring portions 66 of the transmission coil 61 is fixed to the crimp terminal 86 at the fitting portion 87.

Similarly, for example, the second terminal portion 82 is formed in a vertically symmetrical shape with the fourth terminal portion 84. Therefore, the second terminal portion 82 includes an external terminal 85, a crimp terminal 86, and a fitting portion 87.

Similarly to the third terminal portion 83, the other extended wiring portion 66 (the extended wiring portion 66 that is not connected to the first terminal portion 81) of the pair of extended wiring portions 66 of the transmission coil 61 is fixed to the crimp terminal 86 at the fitting portion 87.

Each of the first split cores 32 and the second split cores 34 is integrally formed of a magnetic material as a whole.

Each of the first holder member 41 and the second holder member 51 is integrally molded of, for example, an insulating material such as resin as a whole.

In the present embodiment, the transmission unit 10 is connected to a power supply (not shown in the drawings), and a current is applied to the transmission coil 61 from the power supply. Since a magnetic field is generated around the transmission coil 61 by applying a current to the transmission coil 61, an induced electromotive force is generated in the reception coil 62. That is, in the power transmission device 100, power is transmitted from the transmission coil 61 of the transmission unit 10 to the reception coil 62 of the reception unit 20 by the electromagnetic induction method.

Here, in the present embodiment, the power transmission device 100 further includes a magnetic seal 90.

The magnetic seal 90 is disposed along the outer peripheral surface 110a of the steering shaft 110 from the gap between the outer peripheral surface 110a of the steering shaft 110 and the inner peripheral surface 10a of the transmission unit 10 to the gap between the outer peripheral surface 110a of the steering shaft 110 and the inner peripheral surface 20a of the reception unit 20.

As a result, since the magnetic seal 90 is disposed around the steering shaft 110, even when the steering shaft 110 is made of a metal material, the occurrence of an eddy current in the surface layer of the outer peripheral surface 110a of the steering shaft 110 can be suppressed, and the power transmission efficiency of the power transmission device 100 can be improved.

More specifically, in the power transmission device 100, the power transmission efficiency is indicated by a product of a coupling degree between the transmission coil 61 and the reception coil 62 and a quality factor (Q factor (Q value)) of each of the transmission coil 61 and the reception coil 62. Therefore, in order to improve the power transmission efficiency, it is required to increase the Q factor. According to the above-described configuration, since the resistance value of the transmission coil 61 can be further reduced by suppressing the occurrence of the eddy current, the Q factor of the transmission coil 61 can be increased.

Furthermore, since the occurrence of an eddy current in the surface layer of the outer peripheral surface 110a of the steering shaft 110 is suppressed by the magnetic seal 90, even if each of the inner peripheral surface 10a of the transmission unit 10 and the inner peripheral surface 20a of the reception unit 20 is arranged closer to the steering shaft 110, high power transmission efficiency of the power transmission device 100 can be achieved. Therefore, the power transmission device 100 can be further downsized.

Figures 8A, 8B:
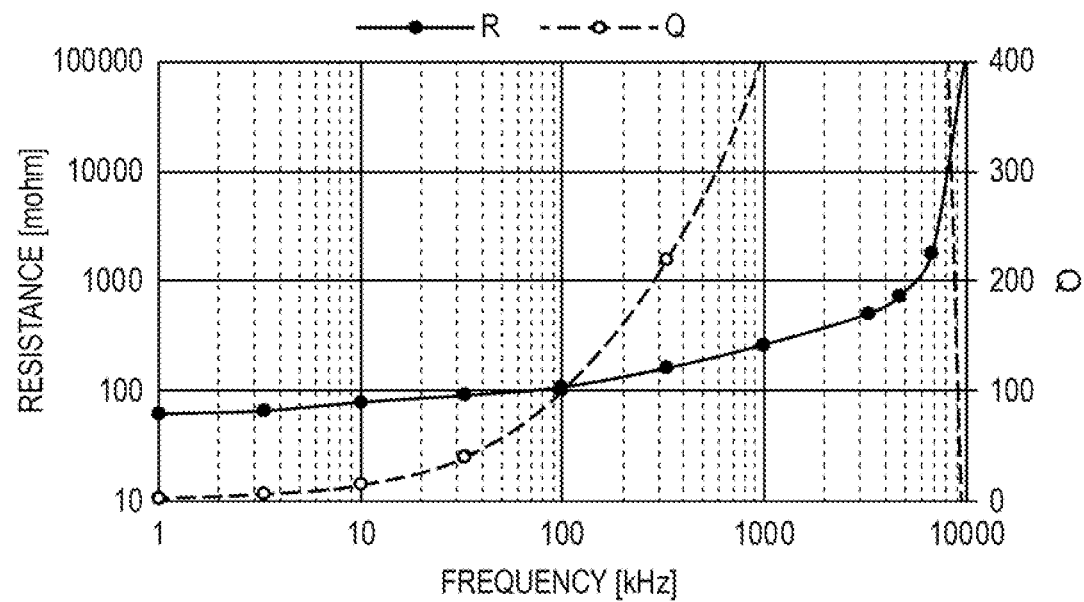
FIGS. 8A and 8B illustrate measured values of characteristics of the first magnetic core of the power transmission device according to the embodiment.
Figures 9A, 9B:
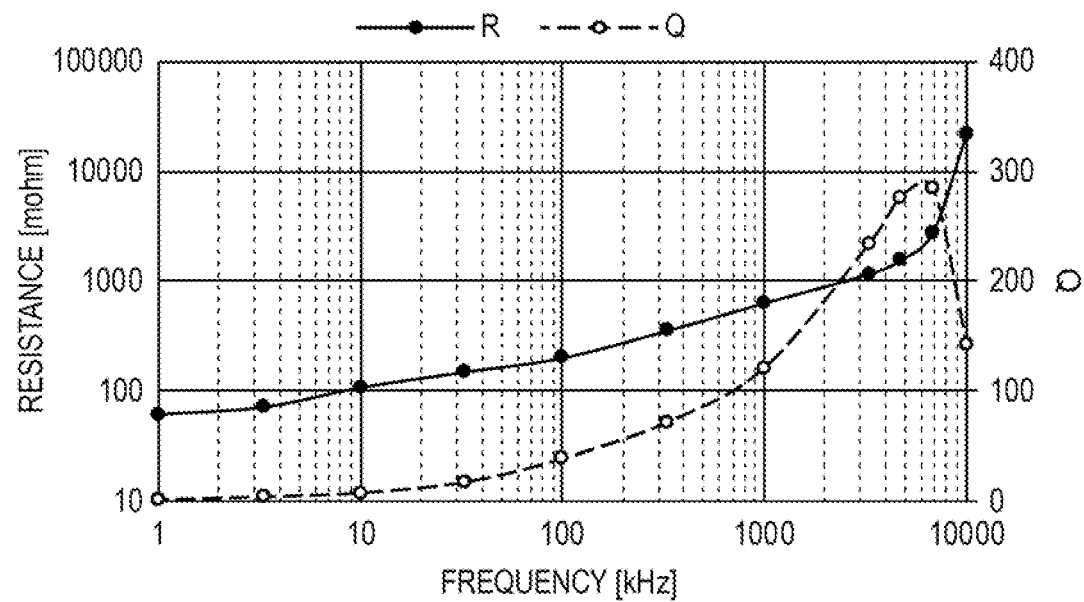
FIGS. 9A and 9B illustrate measured values of characteristics of a first magnetic core of a power transmission device according to a first modification.

Here, FIGS. 8A and 8B illustrate an example of measured values of each characteristic of the transmission coil 61 measured using the power transmission device 100 according to the present embodiment, and FIGS. 9A and 9B illustrate an example of measured values of each characteristic of the transmission coil 61 measured using a power transmission device 100 according to a first modification (power transmission device 100 not including the magnetic seal 90) described later. Among these values, FIGS. 8A and 9A illustrate, in tables, a measured value (L [uH] in FIGS. 8A and 9A) of the inductance of the transmission coil 61, a measured value (R [mohm] [Ω] in FIGS. 8A and 9A) of the resistance of the transmission coil 61, and a measured value (Q in FIGS. 8A and 9A) of the Q factor of the transmission coil 61 at each frequency [kHz] of the power supply. FIG. 8B illustrates a profile obtained by plotting the measured values [mohm] [Ω] of the resistance of the transmission coil 61 in FIG. 8A and a profile obtained by plotting the measured values of the Q factor of the transmission coil 61 in FIG. 8A. FIG. 9B illustrates a profile obtained by plotting the measured values [mohm] [Ω] of the resistance of the transmission coil 61 in FIG. 9A and a profile obtained by plotting the measured values of the Q factor of the transmission coil 61 in FIG. 9A. In addition, in FIGS. 8B and 9B, the vertical axis on the right side represents the Q factor of the transmission coil 61, the vertical axis on the left side represents the resistance value [mohm], and the horizontal axis represents the frequency [kHz].

As illustrated in FIGS. 8A and 8B, as compared with the case where the power transmission device 100 according to the first modification described later is used (see FIGS. 9A and 9B), when the power transmission device 100 according to the present embodiment is used, the measured value of the resistance of the transmission coil 61 further decreases, while the measured value of the Q factor of the transmission coil 61 further increases.

More specifically, for example, when the frequency of the power supply is 100 kHz, an example of the measured value of the resistance of the transmission coil 61 measured using the power transmission device 100 according to the present embodiment is 107 mohm, and an example of the Q factor of the transmission coil 61 is 100.

On the other hand, for example, when the frequency of the power supply is 100 kHz, an example of the measured value of the resistance of the transmission coil 61 measured using the power transmission device 100 without the magnetic seal 90 is 200 mohm, and an example of the Q factor of the transmission coil 61 is 39.

As described above, by disposing the magnetic seal 90 around the steering shaft 110, the Q factor of the transmission coil 61 can be increased, so that the power transmission efficiency of the power transmission device 100 can be improved.

Figure 7:
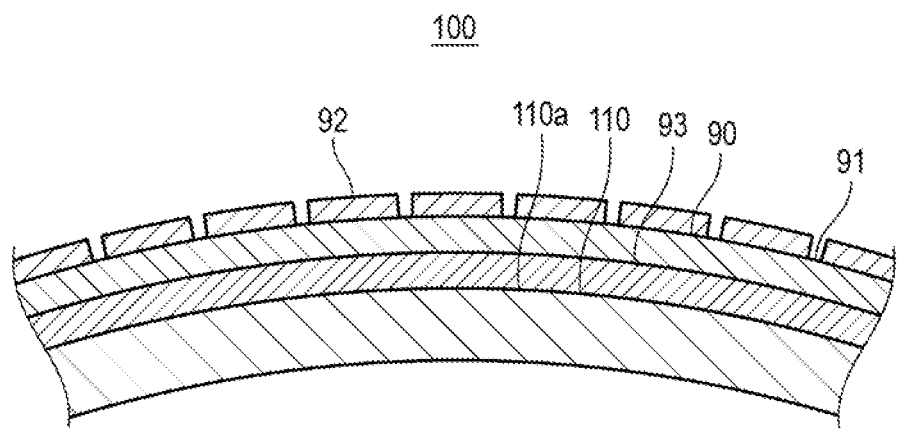
FIG. 7 is an enlarged view of a portion A illustrated in FIG. 4.

As illustrated in FIG. 7, the magnetic seal 90 includes, for example, a sheet-like base material 91, a plurality of magnetic bodies 92 disposed on one surface of the base material 91, and an adhesive layer 93 formed on the other surface of the base material 91. FIG. 7 is a cross-sectional view taken along the radial direction.

The base material 91 is made of, for example, a soft resin material.

Each of the plurality of magnetic bodies 92 is formed in, for example, a thin plate shape, and the shape of each magnetic body 92 is not particularly limited, but may be, for example, a substantially rectangular shape. For example, the plurality of magnetic bodies 92 is arranged in an array on substantially the entire one surface of the base material 91.

The plurality of magnetic bodies 92 is, for example, sintered ferrite having high magnetic permeability. Therefore, the magnetic seal 90 can satisfactorily suppress leakage of magnetic flux generated around the transmission coil 61.

The magnetic seal 90 is fixed to the outer peripheral surface 110a of the steering shaft 110 via the adhesive layer 93, for example. More specifically, the opposite surface of the base material 91 on which the adhesive layer 93 is formed is disposed along the outer peripheral surface 110a of the steering shaft 110. In addition, the one surface of the base material 91 on which the plurality of magnetic bodies 92 is disposed is disposed along each of the inner peripheral surface 10a of the transmission unit 10 and the inner peripheral surface 20a of the reception unit 20. For example, the magnetic seal 90 is fixed to the steering shaft 110 via the adhesive layer 93 in a state of being wound along the outer peripheral surface 110a of the steering shaft 110. Here, when the magnetic seal 90 is wound around the steering shaft 110, since the plurality of magnetic bodies 92 is arranged in an array, the magnetic seal 90 can be easily deformed into a shape along the outer peripheral surface 110a of the steering shaft 110.

However, the magnetic seal 90 may be disposed, for example, along each of the inner peripheral surface 10a of the transmission unit 10 and the inner peripheral surface 20a of the reception unit 20. In this case, the opposite surface of the base material 91 on which the adhesive layer 93 is formed is disposed along each of the inner peripheral surface 10a of the transmission unit 10 and the inner peripheral surface 20a of the reception unit 20.

Here, for example, the steering shaft 110 has the shaft 115 formed in a cylindrical shape as described above, and the connecting member 120 (see FIGS. 1 and 2 and the like) is attached to the upper end portion of the shaft 115. For example, the steering wheel is attached to the connecting member 120 and is connected to the upper end portion of the shaft 115 via the connecting member 120. Note that FIGS. 1 and 6 illustrate a state in which the connecting member 120 is inserted through the cavity 11 of the transmission unit 10 and the cavity 21 of the reception unit 20.

When a rotation operation is performed on the steering wheel, the shaft 115 rotates about the axis of the shaft 115 along with the steering wheel and the connecting member 120.

More specifically, the connecting member 120 includes a columnar portion 121 formed in a columnar shape with the vertical direction as the axial direction, a through hole 123 penetrating the columnar portion 121 in the vertical direction, and a flange portion 124 protruding from the upper edge of the columnar portion 121 to the periphery.

In the present embodiment, the steering wheel is attached to the connecting member 120 by fitting a part of the steering wheel into the through hole 123 of the connecting member 120.

By fitting a lower portion of the columnar portion 121 into the shaft 115, the connecting member 120 is attached to the upper end portion of the shaft 115.

More specifically, the lower portion of the columnar portion 121 of the connecting member 120 constitutes a stepped fitting portion 122, and the outer diameter of the connecting member 120 decreases downward in two stages. The connecting member 120 and the steering wheel is attached to the shaft 115 by fitting the fitting portion 122 into the inner cavity of the upper end portion of the shaft 115. The upper portion of the columnar portion 121 is positioned above the upper end portion of the shaft 115, and the outer peripheral surface of the upper portion faces the inner peripheral surface 20a of the reception unit 20. The outer peripheral surface of the upper portion of the columnar portion 121 is disposed on the same cylindrical surface as the outer peripheral surface of the shaft 115.

The columnar portion 121 of the connecting member 120 is inserted into the cavity 11 of the transmission unit 10 and the cavity 21 of the reception unit 20.

As illustrated in FIG. 6, in the present embodiment, for example, the magnetic seal 90 is arranged circumferentially along the outer peripheral surface of the upper portion of the columnar portion 121 and the outer peripheral surface of the upper end portion of the shaft 115 so as to cover a portion from the upper portion of the columnar portion 121 to the upper end portion of the shaft 115.

As a result, since the magnetic seal 90 collectively wraps the upper portion of the columnar portion 121 and the upper end portion of the shaft 115, a state in which the connecting member 120 is attached to the upper end portion of the shaft 115 can be favorably maintained.

As described above, the outer peripheral surface 110a of the steering shaft 110 is disposed along the inner peripheral surface 10a of the transmission unit 10 and the inner peripheral surface 20a of the reception unit 20. More specifically, the upper outer peripheral surface of the columnar portion 121 is disposed along the inner peripheral surface 20a of the reception unit 20, and the outer peripheral surface of the upper end portion of the shaft 115 is disposed along the inner peripheral surface 10a of the transmission unit 10. Therefore, the outer peripheral surface of the magnetic seal 90 is disposed along the inner peripheral surface 10a of the transmission unit 10 and is disposed along the inner peripheral surface 20a of the reception unit 20.

In the present embodiment, a gap is formed between the outer peripheral surface of the magnetic seal 90 and each of the inner peripheral surface 10a of the transmission unit 10 and the inner peripheral surface 20a of the reception unit 20.

In the present embodiment, the magnetic seal 90 is wound, for example, one or more turns around the outer peripheral surface 110a of the steering shaft 110.

First Modification

Next, FIGS. 9A and 9B illustrate the first modification of the embodiment. A power transmission device 100 according to the present modification is different from the power transmission device 100 according to the above-described embodiment in that the magnetic seal 90 is not provided, and is configured similarly to the power transmission device 100 according to the above-described embodiment in other points.

As described above, when the frequency of the power supply is 100 kHz, an example of the measured value of the resistance of the transmission coil measured using the power transmission device 100 without the magnetic seal 90 is 200 mohm, and an example of the Q factor of the transmission coil is 39.

Second Modification

Figure 10:
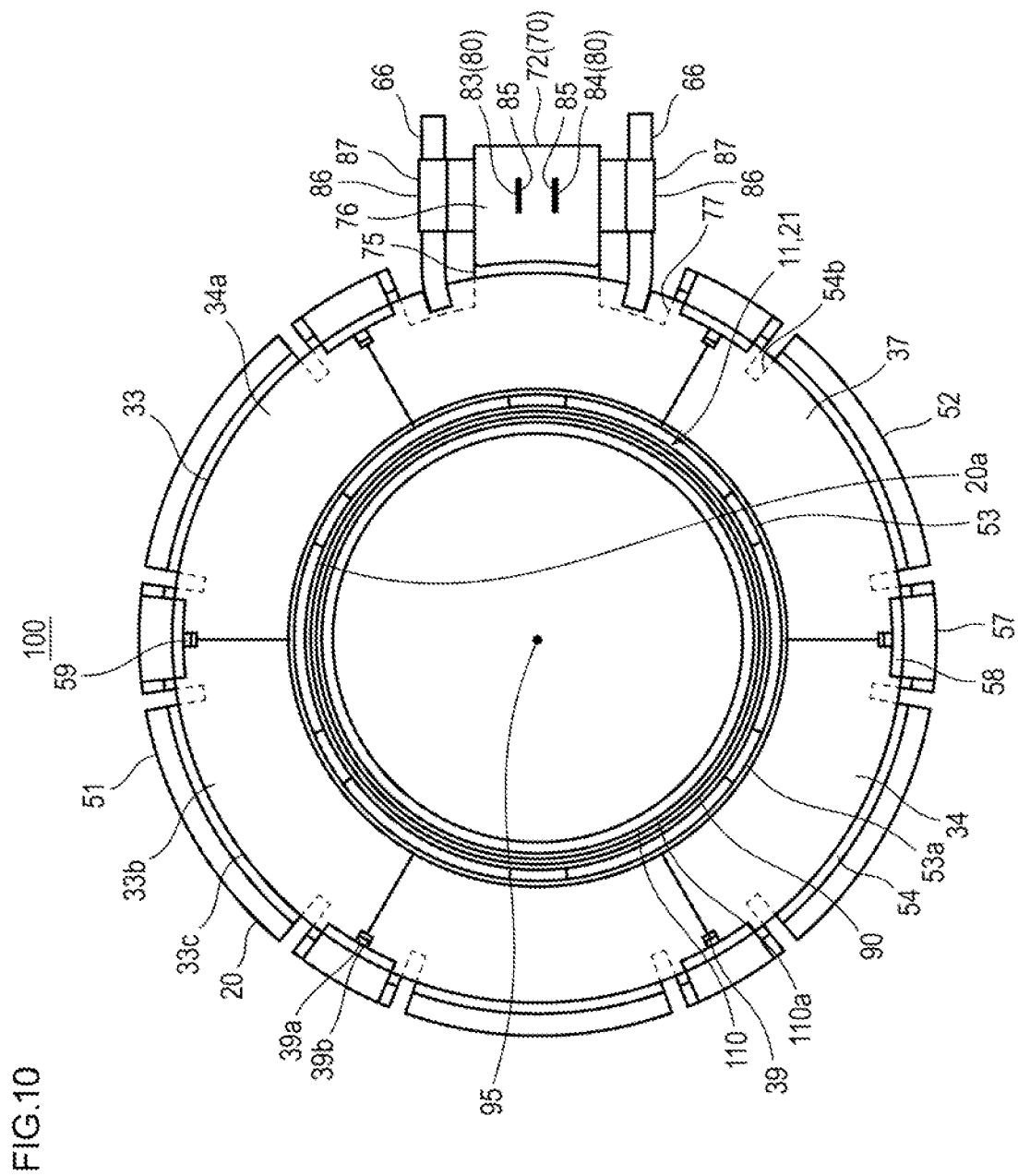
FIG. 10 is a plan view of a power transmission device according to a second modification.

Next, a second modification of the embodiment will be described with reference to FIG. 10. A power transmission device 100 according to the present modification is different from the power transmission devices 100 according to the above-described embodiment and the first modification in the following points, and is configured similarly to the power transmission devices 100 according to the above-described embodiment and the first modification in other points.

In the present modification, the first holder member 41 has first protrusions (not shown in the drawings), each of which is arranged between two first split cores 32 adjacent to each other in the circumferential direction among the first split cores 32, and the second holder member 51 has second protrusions 59 (see FIG. 10), each of which is arranged between two second split cores 34 adjacent to each other in the circumferential direction among the second split cores 34.

This makes it possible to suppress displacement of the first split cores 32 in the circumferential direction. In addition, it is possible to suppress displacement of the second split cores 34 in the circumferential direction.

In the present modification, as an example, the second holder member 51 includes second protrusions 59 instead of the second engagement protrusions 56. Each notch-shaped portion 39 is formed between two first split cores 32 adjacent to each other among the first split cores 32, and the second protrusions 59 are engaged with the notch-shaped portions 39.

More specifically, each of the second protrusions 59 is, for example, a protrusion extending toward the radial inner side from the inner peripheral surface of each of the second upright wall portions 57, unlike the second engagement protrusions 56.

Further, notch-shaped portions 39a and 39b are formed at both ends of each of the second split cores 34 in the circumferential direction. For example, the notch-shaped portion 39a penetrates the second split core 34 in the vertical direction and is opened toward one side in the circumferential direction, and the notch-shaped portion 39b penetrates the second split core 34 in the vertical direction and is opened toward the other side in the circumferential direction.

Of two second split cores 34 adjacent to each other among the second split cores 34, the notch-shaped portion 39a of one second split core 34 and the notch-shaped portion 39b of the other second split core 34 are combined to form a notch-shaped portion 39.

Similarly to the second holder member 51, the first holder member 41 has, as an example, first protrusions instead of the first engagement protrusions 46. Each notch-shaped portion 39 is formed between two first split cores 32 adjacent to each other among the first split cores 32, and the first protrusions are engaged with the notch-shaped portions 39.

Also in the present modification, the number of second upright wall portions 57 included in the second holder member 51 is, for example, 6. Therefore, the number of second protrusions 59 included in the second holder member 51 is also 6, for example. However, the number of second protrusions 59 is not particularly limited.

Similarly, the number of first upright wall portions 47 included in the first holder member 41 is 6, for example. Therefore, the number of first protrusions included in the first holder member 41 is also 6, for example. However, the number of first protrusions is not particularly limited.

Although each embodiment has been described above with reference to the drawings, these are examples of the present invention, and various configurations other than the above description can be adopted.

For example, in the above description, the example has been described in which the system for transmitting power from the transmission unit 10 to the reception unit 20 is an electromagnetic induction system, but the present invention is not limited to this example, and a magnetic field resonance system may be used.

Furthermore, for example, in the above description, the example has been described in which the first upright wall portions 47 are arranged at the plurality of locations in the circumferential direction, and the second upright wall portions 57 are arranged at the plurality of locations in the circumferential direction. However, in the present invention, for example, the first upright wall portions 47 may be formed in a circling shape along the outer peripheral edge of the first annular portion 44, and the second upright wall portions 57 may be formed in a circling shape along the outer peripheral edge of the second annular portion 54.

The present embodiment includes the following technical ideas.

(1) A power transmission device including an annular transmission unit having an annular first magnetic core and a transmission coil; and an annular reception unit having an annular second magnetic core and a reception coil, wherein the transmission unit and the reception unit are arranged to face each other, the power transmission device transmits power from the transmission unit to the reception unit, the transmission unit and the reception unit are relatively rotatable about a rotation axis passing through a cavity inside the transmission unit and a cavity inside the reception unit, the first magnetic core has a structure divided into a plurality of first split cores in a circumferential direction, and the second magnetic core has a structure divided into a plurality of second split cores in the circumferential direction.

(2) The power transmission device according to (1), wherein the transmission unit includes a first holder member made of resin and holding the first magnetic core, the reception unit includes a second holder member made of resin and holding the second magnetic core, the first holder member has an annular shape arranged along one surface of the first magnetic core in an axial direction, and the second holder member has an annular shape arranged along one surface of the second magnetic core in the axial direction.

(3) The power transmission device according to (2), wherein the first holder member includes a first engagement protrusion that engages with the first split core, and positional displacement of the first split core in the circumferential direction is restricted by the first engagement protrusion, the second holder member includes a second engagement protrusion that engages with the second split core, and positional displacement of the second split core in the circumferential direction is restricted by the second engagement protrusion.

(4) The power transmission device according to (2) or (3), wherein the first holder member includes a first upright wall portion disposed along an outer peripheral surface of the first magnetic core, and the first upright wall portion is disposed at each of a plurality of locations in the circumferential direction, the second holder member includes a second upright wall portion disposed along an outer peripheral surface of the second magnetic core, and the second upright wall portion is disposed at each of a plurality of locations in the circumferential direction.

(5) The power transmission device according to (4), wherein the first upright wall portion includes a first engagement claw portion that engages with a surface of the first magnetic core opposite to the one surface of the first magnetic core, and the second upright wall portion includes a second engagement claw portion that engages with a surface of the second magnetic core opposite to the one surface of the second magnetic core.

(6) The power transmission device according to (2) or (3), wherein the first holder member includes a first upright wall portion disposed along an outer peripheral surface of the first magnetic core, the first upright wall portion includes a first engagement claw portion that engages with a surface of the first magnetic core opposite to the one surface of the first magnetic core, the second holder member includes a second upright wall portion disposed along an outer peripheral surface of the second magnetic core, and the second upright wall portion includes a second engagement claw portion that engages with a surface of the second magnetic core opposite to the one surface of the second magnetic core.

(7) The power transmission device according to (5) or (6), wherein the common first engagement claw portion is engaged with two first split cores adjacent to each other among the plurality of first split cores of the first magnetic core, and the common second engagement claw portion is engaged with two second split cores adjacent to each other among the plurality of second split cores of the second magnetic core.

(8) The power transmission device according to any one of (1) to (7), wherein the transmission unit and the reception unit are disposed around a metal steering shaft, the power transmission device further includes a magnetic seal, and the magnetic seal is disposed along an outer peripheral surface of the steering shaft from a gap between an outer peripheral surface of the steering shaft and an inner peripheral surface of the transmission unit to a gap between the outer peripheral surface of the steering shaft and an inner peripheral surface of the reception unit.

What is claimed is:

1. A power transmission device comprising:
an annular transmission unit having an annular first magnetic core and a transmission coil; and
an annular reception unit having an annular second magnetic core and a reception coil, wherein
the transmission unit and the reception unit are arranged to face each other,
the power transmission device transmits power from the transmission unit to the reception unit,
the transmission unit and the reception unit are relatively rotatable about a rotation axis passing through a cavity inside the transmission unit and a cavity inside the reception unit,
the first magnetic core has a structure divided into a plurality of first split cores in a circumferential direction, and the second magnetic core has a structure divided into a plurality of second split cores in the circumferential direction,
the transmission unit includes a first holder member made of resin and holding the first magnetic core,
the reception unit includes a second holder member made of resin and holding the second magnetic core,
the first holder member is in an annular shape,
a part of the first holder member is arranged in accordance with a first surface of the first magnetic core, and the first surface of the first magnetic core axially faces a second surface of the second magnetic core in the reception unit,
the second holder member is in an annular shape,
a part of the second holder member is arranged in accordance with the second surface of the second magnetic core, and the second surface of the second magnetic core axially faces the first surface of the first magnetic core in the transmission unit, and
the transmission coil and the reception coil are aligned along a direction parallel to the rotation axis and face each other via the first and second holder members.

2. The power transmission device according to claim 1, wherein the first holder member includes a first engagement protrusion that engages with the plurality of first split cores, and positional displacement of the plurality of first split cores in the circumferential direction is restricted by the first engagement protrusion, and the second holder member includes a second engagement protrusion that engages with the plurality of second split cores, and positional displacement of the plurality of second split cores in the circumferential direction is restricted by the second engagement protrusion.

3. The power transmission device according to claim 1, wherein the first holder member includes a plurality of first upright walls disposed along an outer peripheral surface of the first magnetic core, and the plurality of first upright walls are disposed at a plurality of locations of the first holder member in the circumferential direction, and the second holder member includes a plurality of second upright walls disposed along an outer peripheral surface of the second magnetic core, and the plurality of second upright walls are disposed at a plurality of locations of the second holder member in the circumferential direction.

4. The power transmission device according to claim 3, wherein each of the plurality of first upright walls includes a first engagement claw that engages with a surface of the first magnetic core opposite to the first surface of the first magnetic core, and each of the plurality of second upright walls includes a second engagement claw that engages with a surface of the second magnetic core opposite to the second surface of the second magnetic core.

5. The power transmission device according to claim 1, wherein the first holder member includes a first upright wall disposed along an outer peripheral surface of the first magnetic core, the first upright wall includes a first engagement claw that engages with a surface of the first magnetic core opposite to the first surface of the first magnetic core, the second holder member includes a second upright wall disposed along an outer peripheral surface of the second magnetic core, and the second upright wall includes a second engagement claw that engages with a surface of the second magnetic core opposite to the second surface of the second magnetic core.

6. The power transmission device according to claim 5, wherein the first engagement claw is engaged commonly with two first split cores that are adjacent to each other among the plurality of first split cores of the first magnetic core, and the second engagement claw is engaged commonly with two second split cores that are adjacent to each other among the plurality of second split cores of the second magnetic core.

7. The power transmission device according to claim 1, further comprising:

a magnetic seal, wherein the transmission unit and the reception unit are disposed around a metal steering shaft, and the magnetic seal is disposed along an outer peripheral surface of the steering shaft from a gap between the outer peripheral surface of the steering shaft and an inner peripheral surface of the transmission unit to a gap between the outer peripheral surface of the steering shaft and an inner peripheral surface of the reception unit.

* * * * *